(12) United States Patent
Johansson

(10) Patent No.: US 6,782,991 B2
(45) Date of Patent: Aug. 31, 2004

(54) BOARD TURNER

(75) Inventor: Jan Johansson, Skellefteå (SE)

(73) Assignee: Renholmens Mekaniska Verkstad AB, Byske (DE)

( * ) Notice: Subject to any disclaimer, the term of this patent is extended or adjusted under 35 U.S.C. 154(b) by 0 days.

(21) Appl. No.: 10/389,288

(22) Filed: Mar. 14, 2003

(65) Prior Publication Data
US 2004/0050658 A1 Mar. 18, 2004

(30) Foreign Application Priority Data
Mar. 15, 2002 (SE) .............................. 0200781

(51) Int. Cl.[7] .............................................. B65G 47/24
(52) U.S. Cl. .................. 198/401; 198/376; 198/377.07; 198/403; 198/404
(58) Field of Search ................ 198/395, 401, 198/376, 377.07, 403, 404

(56) References Cited

U.S. PATENT DOCUMENTS

| 3,308,969 | A | * | 3/1967 | Orms et al. | 198/403 |
| 4,249,440 | A | * | 2/1981 | Feuillade | 198/403 |
| 4,523,670 | A | * | 6/1985 | Yanagisawa et al. | 198/403 |
| 4,573,863 | A | * | 3/1986 | Picotte | 198/403 |
| 4,754,863 | A | * | 7/1988 | Tsuchiya et al. | 198/403 |
| 4,907,686 | A |   | 3/1990 | Cotic |  |
| 4,936,437 | A |   | 6/1990 | Gearhart |  |
| 5,482,140 | A |   | 1/1996 | Moore |  |
| 5,605,216 | A |   | 2/1997 | Raybon et al. |  |

FOREIGN PATENT DOCUMENTS

SE 78017 12/1930

* cited by examiner

Primary Examiner—Joseph Valenza
(74) Attorney, Agent, or Firm—Ware, Fressola, Van der Sluys & Adolphoson LLP

(57) ABSTRACT

A board turner (1, 31) is intended for use on a conveyor (3) for transporting large volumes of boards. The conveyor (3) defines a plane for carrying boards (14) and the board turner (1, 31) has a rotation unit (4) and a gripping unit (7) mounted on the rotation unit (4). The gripping unit (7) has an open position and a closed position and is switchable between these positions in response to a signal from a sensor. In the open position, the gripping unit (7) rotates past the carrying plane without making contact with the synchronously arriving board (14). A signal from the sensor switches the gripping unit (7) between the open position and the closed position while the gripping unit (7) grips two opposite surfaces of a sideways extending part of the board (14) and continues to rotate above the belt conveyor (3) in order to turn the board (14) in this way.

10 Claims, 4 Drawing Sheets

BOARD TURNER

BACKGROUND OF THE INVENTION

1. Technical Field

The present invention concerns a board turner intended for use on a conveyor and in particular a board turner for use on conveyors carrying large volumes of boards.

2. Description of the Background Art

A number of devices for turning boards in timber processing machines are previously known. U.S. Pat. No. 5,482,140 describes a rotating board turner for use on a conveyor. The power used to turn the boards is achieved by the forward motion of the boards themselves while they are being transported along the conveyor. The device comprises a rotating hub with arms located at regular distances from each other in the same plane that extend radially out from the hub. Each and every one of the arms comprises a board holder for receiving the boards from the conveyor's board transporter and retaining the boards while the arm rotates around the hub and laying the board back on the conveyor downstream from the turner. This device is located in direct connection with the transport path of the boards and turns all the boards.

U.S. Pat. No. 5,605,216 describes a board turning device for use on a conveyor for transporting boards through an inspection station. The boards are inspected with photocells that are connected to a computer for analyzing the result of the board inspection. To the computer is also connected a turning arm and in response to a signal from the computer, the turning arm is induced to engage an edge of the board and turn the same by rotating it around its opposite edge. This device rotates the board backwards and therefore requires a space behind each board corresponding to at least the width of the board itself.

U.S. Pat. No. 4,907,686 describes an electromagnetic system for reorienting the position of a sensed or detected article transported on the inclined surface of a conveyor. Plates transported on the conveyor are turned by means of a reciprocating thrower that forwards an impulse to one end of non-movable plate that induces the plate to turn over. This system requires space in front of the plate that is at least equal to the width of the plate itself. U.S. Pat. No. 4,936,437 describes also a board turning device comprising a plate exhibiting a support for stopping the board and a lifting surface. This turner throws the board in response to switches that are triggered either manually or by the board itself.

All the board turners described above are mounted in or below the conveyor for the boards being turned. The device described in U.S. Pat. No. 5,482,140 can turn the board within its own area on the conveyor without any need for additional space on any side of the board, which is necessary for this function in the other devices described in the patents. The device described in U.S. Pat. No. 5,482,140 turns every board on the conveyor, however. One object of the present invention is to achieve a board turner that makes it possible to increase the volume of processed boards while maintaining the possibility of allowing a board to pass without turning.

SUMMARY OF THE INVENTION

In agreement herewith is achieved a board turner intended for use on a conveyor for transporting boards where the conveyor defines a carrying plane for supporting the boards, whereby the board turner comprises means of rotation and means of gripping mounted on the means of rotation, where the means of gripping is arranged at a lateral distance from the conveyor and exhibiting a rotation path forming a carrying plane that is essentially parallel to the plane that is defined by the conveyor's rotation path, whereby the rotation path of the means of gripping extends above and below the plane of the conveyor, the means of gripping has an open position and a closed position and is switchable between these positions as a response to a signal from a sensor in which in the open position the means of gripping rotates past the carrying plane without coming into contact with a synchronously arriving board and by which means with the help of a signal from the sensor the means of gripping is switched between the open position and the closed position while the means of gripping rotates upward in a straight line with the synchronously arriving board while gripping two opposite surfaces of a laterally extending part of the board, whereby the means of gripping continuously rotating above the conveyor in this way turns the board and returns the board to the conveyor in response to a second signal that switches the means of gripping from the closed position to the open position.

Principally, the means of rotation rotates so that the means of gripping is located in a synchronized line with every board while the means of gripping rotates upwards and past the carrying plane of the conveyor.

Principally, the rotation axis of the means of rotation is essentially parallel to the rotation axis of the conveyor when the means of rotation is used together with it.

The rotation axis of the means of rotation is suitably located below the carrying plane of the conveyor.

Principally, the means of gripping comprises a gripping unit that exhibits a pair of facing gripping parts designed to close against each other and open away from each other in response to a signal from a sensor allowing the gripping parts to grip and release boards being transported on the conveyor.

Principally, the means of gripping is controlled mechanically, electrically, pneumatically or hydraulically.

A cylinder is suitably used to operate the means of gripping in response to a signal from the sensor.

In a present embodiment, the means of gripping comprises two linking pieces that together with their respective ends are hinge-mounted to a piston rod and which each individually at their respective other end is connected to a one of the facing gripping parts, a support part combined with each of the said link pieces and hinge-mounted at one end located between the link piece ends and hinge-mounted at the other end to a construction that is immovable relative to the link pieces and the cylinder, by which means the operation of the piston affects each link piece to swing around a hinge point between the ends of the same and in doing so move the facing gripping parts away from each other or towards each other.

In one embodiment, the turner is a separate unit located at a lateral distance from the conveyor.

Principally, there is a separate means of driving arranged for rotation of the means of rotation.

The means of rotation is suitably connected to a means of driving the conveyor.

Principally, the coupling between the means of rotation and the means of driving the conveyor achieves a synchronized alignment between the means of gripping and each board.

Principally, the coupling is a mechanical coupling arranged by means of a chain that links the two drive wheels to each other, of which one wheel is mounted on the means of driving the conveyor and the other wheel is mounted on the means of rotation.

In another embodiment, the synchronized alignment between the means of gripping and the board is achieved electronically.

The invention further comprises a conveyor with a board turner arranged on it.

Principally, the means of rotation is arranged with a rotation unit comprising a continuous shaft that is mounted in a protective sleeve located along the conveyor.

In operation, the conveyor transports the boards with their longitudinal axes extending across the direction of the conveyor and the means of rotation rotates the means of gripping, whereby the means of gripping is in synchronous alignment with each board while the means of gripping rotates upwards from a position below the carrying plane of the conveyor, a sensor detects the boards and as a response to the event that a board is to be turned, the sensor sends a signal to the means of operating the means of gripping, whereby the means of gripping is switched from an open position to a closed position by means of an upper means of control and at the moment of alignment, the means of gripping grips one end of the board extending sideways from the conveyor, the means of gripping continues to rotate above the carrying plane of the conveyor and the board is turned, the means of gripping is activated between its closed position and open position in response to a second signal allowing the means of gripping to release the end of the board for returning it to the conveyor.

Principally, the board is replaced in its original position on the conveyor.

Principally, three means of gripping are mounted on the means of rotation, which seen from the direction of rotation are located at equal distances from each other around the axis of the means of rotation.

The gripping surfaces of the gripping parts should be essentially parallel with the surfaces of the board to be gripped while the means of gripping rotates in line with the synchronously arriving boards.

Principally, a photoelectric sensor is used to monitor the boards and generate a signal that is conveyed to the means of controlling the means of gripping when the sensor determines that a board is to be turned.

Around two hundred boards per minute can suitably be turned.

BRIEF DESCRIPTION OF THE DRAWINGS

The invention will now be described referring to the attached drawings and which based on only two embodiments show examples of a board turner according to the invention.

In the drawings

DETAILED DESCRIPTION OF THE INVENTION

Figure 1:
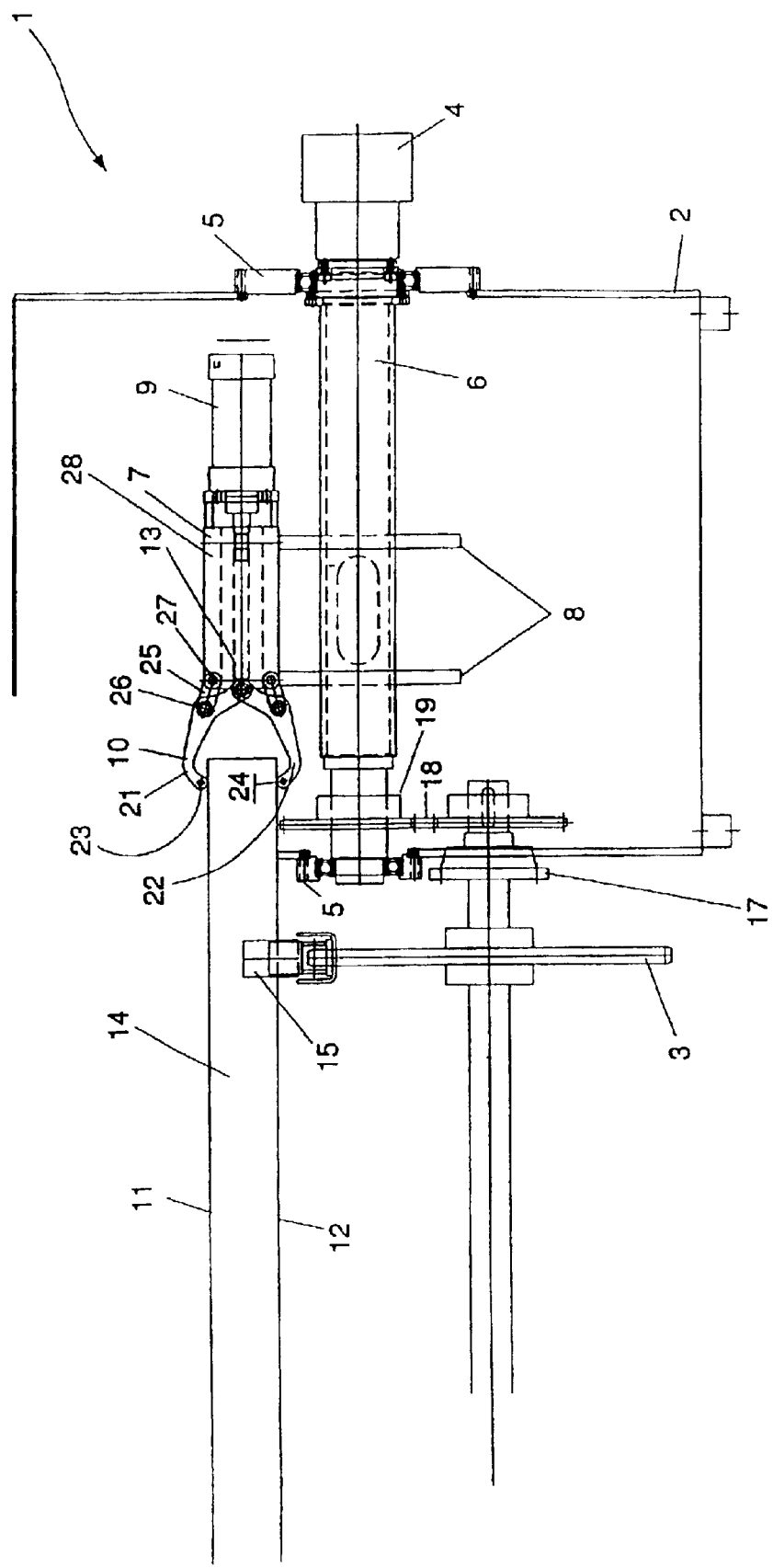
FIG. 1 shows a side view of a turner located along the side of a conveyor.
Figure 2:
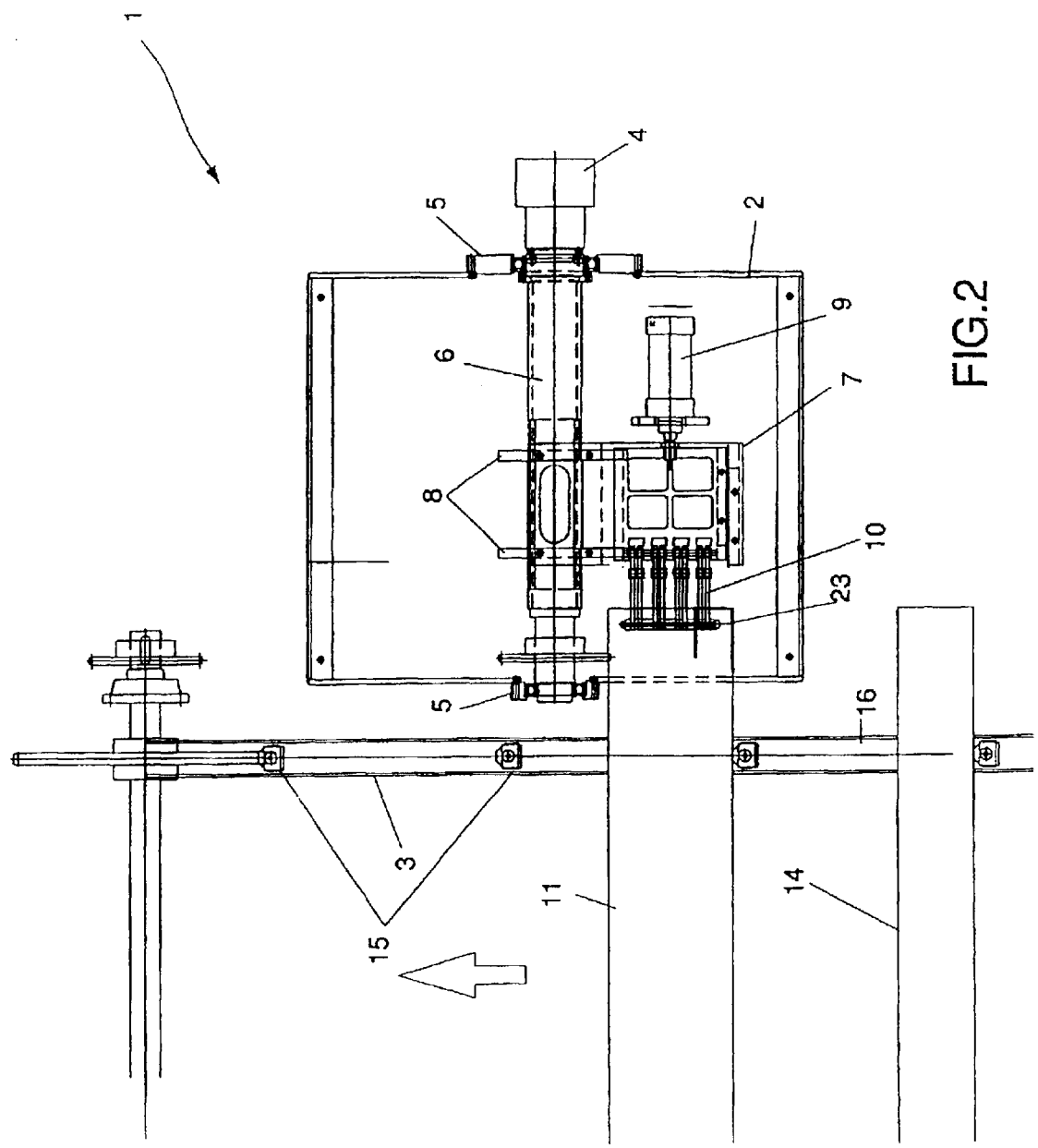
FIG. 2 shows a plan view of the device in FIG. 1.

Referring to the drawings and initially to FIG. 1 and FIG. 2, a board turner is illustrated generally designated with reference number 1. Turner 1 is mounted in a protective covering 2 and is located along one side of a conveyor 3. The turner has a rotation unit 4 that is carried by a pair of retaining units 5 mounted on the safety casing 2. The rotation unit 4 is formed by a continuous shaft 6 extending between the retaining units 5. A gripping unit 7 is mounted on the rotation unit 4 shaft 6 by means of a pair of support beams 8 extending sideways from the shaft 6. The gripping unit 7 has a cylinder and piston unit 9 and one end of the piston 13 is connected with linking parts 10, which are shown in closed position in FIG. 1 and FIG. 2. The said linking parts 10 are described in more detail below. The linking parts 10 are designed to be localized on the opposing main surfaces 11, 12 of the board 14. The board 14 is carried along the conveyor 3 with its longitudinal axis extending across the direction of travel of the conveyor 3. The board 14 is moved along the conveyor 3 by means of blocks 15 extending upwards from the conveyor 3 belt 16. The conveyor 3 has a drive unit 17 that by means of a chain 18 is connected to a drive wheel 19 of the rotation unit 4.

The linking parts 10 of the gripping unit 7 are hinge mounted together at one of their respective ends to one end of the piston 13 and are separately joined at their respective other ends 21, 22 to one of the interfacing gripping parts 23, 24. Each linking part 10 has a support part 25 joined to it that is hinge-mounted at one end 26 between the ends of the linking part 10 and hinge-mounted at the other end 27 to a construction 28 for carrying the piston and cylinder unit 9. When in operation, an activation of the piston 13 will bring each linking part 10 to pivot around its hinge point 26 while the interfacing gripping parts 23, 24 move to or from each other.

Figure 3:
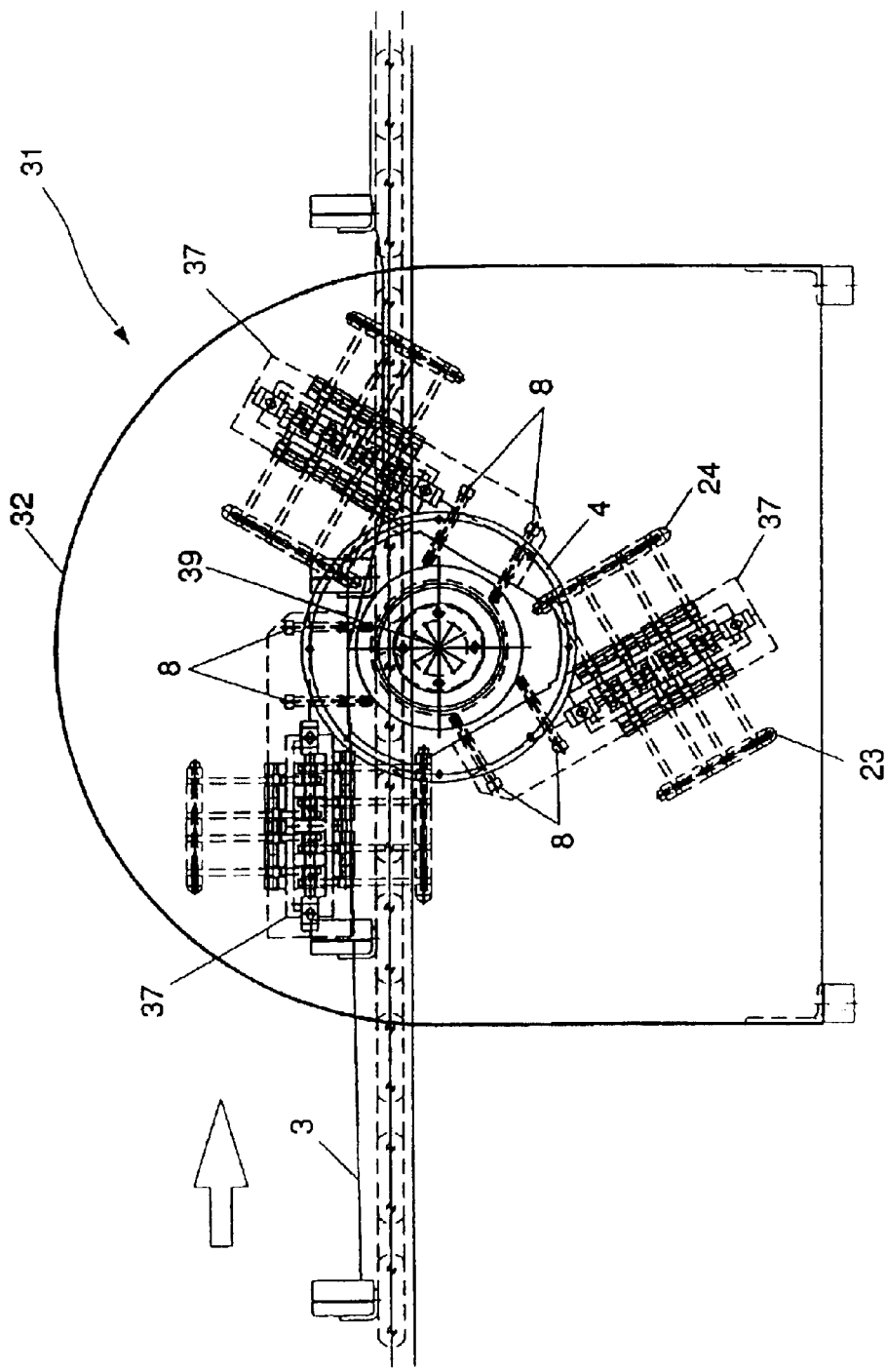
FIG. 3 shows a side view of a second embodiment of the turner.

FIG. 3 shows a turner generally designated with reference number 31 that has three gripping units 37 mounted on a rotation unit 4 by means of support beams 8. The gripping units 37 are at equal relative distances evenly distributed around the circumference of the rotation unit 4 and are all illustrated in open position. Each gripping unit 37 is of a design similar to gripping unit 7 that is described referring to FIGS. 1 and 2 above. The rotation axis 39 of the rotation unit 4 is situated below the conveyor 3 on which the boards are transported. The entire turner 31 is enclosed in a protective cover 32.

Figure 4:
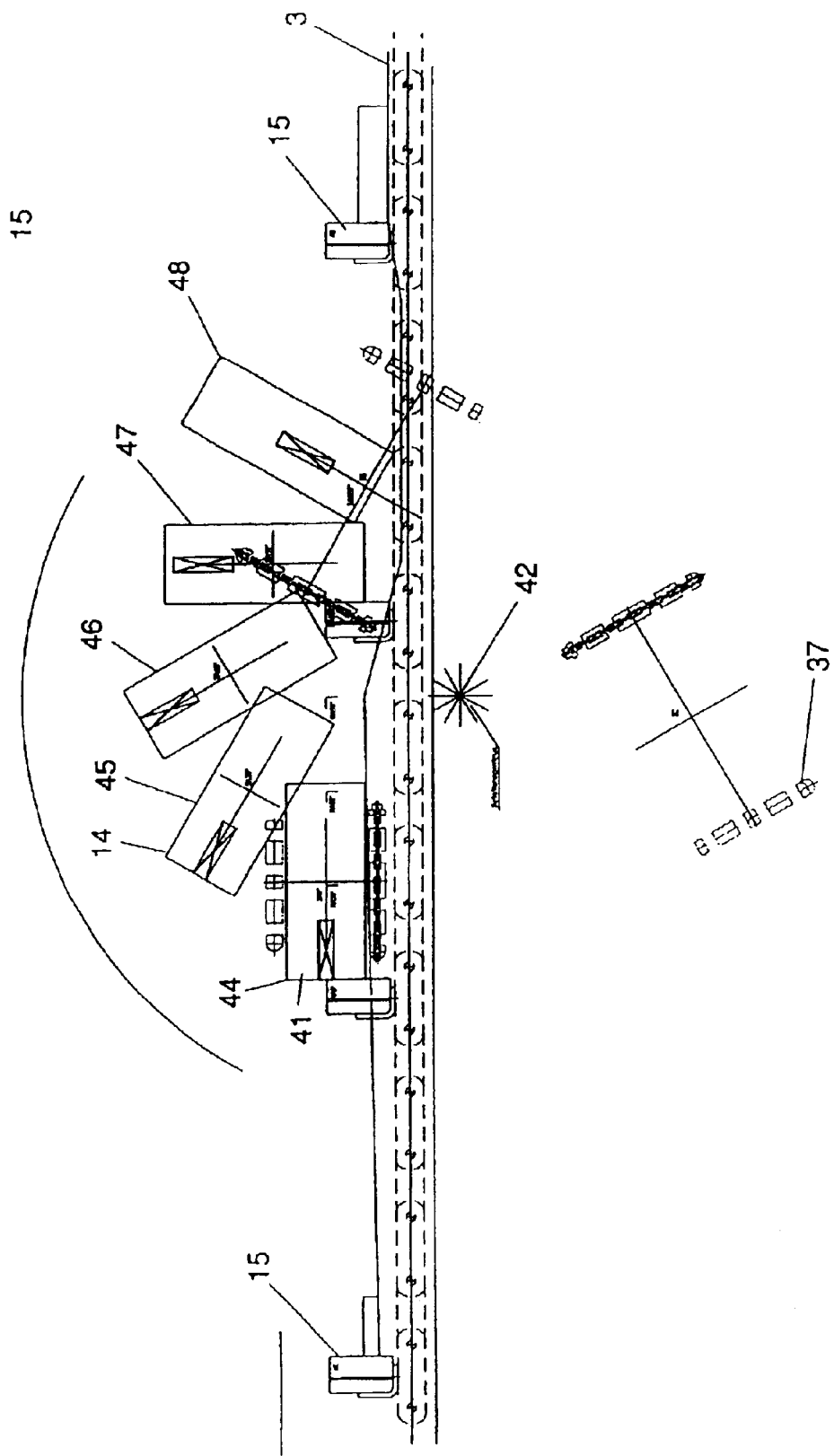
FIG. 4 shows a schematic side view of a board being turned.

Referring to FIG. 4, a belt conveyor 3 that is fitted with blocks 15 extending upwards from it is illustrated. One edge 41 of a board 14 is illustrated resting on the conveyor 3 before the gripping unit 37 (partially illustrated) takes a grip of it. The rotation unit rotation axis 42 (not shown) is situated below the conveyor 3. The edge of the board 41 is shown in different positions 44, 45, 46, 47 and 48 while it is being turned by the gripping unit 37. Position 48 is the point in the turning process where the gripping unit releases the board, which as a result of this falls back onto the conveyor 3.

When in operation, the belt conveyor 3 transports the boards 14 at a relative distance from each other with their longitudinal axis extending across the direction of travel of the conveyor 3. The rotation unit 4 rotates the gripping unit 7, 37, which thereby synchronously lines up with each board while the gripping unit 7, 37 rotates upwards from a position below the carrying plane of the conveyor. In response to a signal from a sensor (not shown), the board 14 is turned by means of the gripping unit 7, 37. The gripping unit 7, 37 is switched between open and closed positions in response to a sensor signal by means of the cylinder and piston unit 9 at the precise moment the gripping unit is in line with the board 14. The gripping unit 7, 37 grips one end of the board that is extending sideways from the conveyor 3 and while holding the board in a secure manner, the gripping unit 7, 37 continues to rotate above the carrying plane of the belt conveyor. The board is turned and operation of cylinder 9 arranges the gripping unit 7, 37 between the closed position and the open position to thereby allow the gripping unit 7, 37 to release its grip of the board end so that the board falls back to the conveyor 3. A longitudinal edge of the board engages with the blocks 15 extending upwards. The drive unit 17 that drives the conveyor 3 is connected to the rotation unit 4 by means of a chain 18. The gear ratio between the drive unit 17 and the rotation unit 14 is determined in advance in such a way that the gripping unit 37 synchronously aligns itself with each board 14 being transported on the conveyor 3. In this way, each gripping unit 37 is able to grip one board 14 during its rotation and thereby improve the volume of boards being handled per unit of time.

Of course, it should be evident that the detailed description of the specific embodiments in no way limits the board turner and that these embodiments are only to serve as examples and that various changes and modifications may be made to the specific embodiments without departing from the idea of invention such as it is defined in the attached claims.

What is claimed is:

1. Board turner intended for use on a conveyor for transporting boards in which the conveyor defines a carrying plane for supporting the boards and a rotation path, the board turner comprises:

(a) means of rotation having a rotation axis; and
    (b) means of gripping mounted on the means of rotation, the means of gripping is arranged at a lateral distance from the conveyor and exhibits a rotation path defining a plane that is essentially parallel to a plane that is defined by the rotation path of the conveyor, the rotation path of the means of gripping extends above and below the carrying plane of the conveyor, the means of gripping has an open position and a closed position and is switchable between these positions in response to a signal from a sensor in which, in the open position, the means of gripping rotates past the carrying plane of the conveyor without coming into contact with a synchronously arriving board and by which means during operation a signal from the sensor switches the means of gripping between the open position and the closed position while the means of gripping rotates upward and in line with the synchronously arriving board while gripping two opposite surfaces of a laterally extending part of the board, whereby the means of gripping continues rotating above the conveyor to thereby turn the board and subsequently release the board back onto the conveyor in response to a second signal that switches the means of gripping from the closed position to the open position.

2. Board turner according to claim 1, whereby the rotation axis of the means of rotation is positioned below the carrying plane of the conveyor.

3. Board turner according to claim 1, whereby the boards are transported at a relative distance from each other on the conveyor.

4. Board turner according to claim 1, whereby the means for gripping is three means of gripping mounted on the means of rotation and in the direction of rotation are evenly distributed around the means of rotation.

5. Board turner according to claim 1, whereby the means of gripping comprises a pair of interfacing gripping parts designed to close while moving towards each other and open while moving away from each other in response to a signal from the sensor in order to allow the gripping parts to grip and release boards transported on the conveyor.

6. Board turner according to claim 5, whereby the means of gripping comprises two linking parts which are pivot-mounted together at their respective one end to a cylinder piston and which are separately joined at their respective other ends to one of the interfacing gripping parts, a support part that is joined to each linking part and is pivot-mounted at one end situated between the linking part ends and pivot-mounted at the other end to a construction that is immovable relative the linking parts and the cylinder by which means operation of the piston brings each linking part to pivot around the hinge point between its ends and in this way move the interfacing gripping parts away from each other or towards each other.

7. Board turner according to claim 1, whereby the means of rotation is connected to means for driving the conveyor.

8. Board turner according to claim 7, whereby the coupling between the means of rotation and the means for driving the conveyor provides a synchronized alignment between the means of gripping and the boards.

9. Board turner according to claim 1, whereby a photo-electric sensor is used to monitor the boards and generate a signal that is conveyed to means of controlling arranged for the means of gripping where the sensor determines that a board is to be turned.

10. Method of turning boards comprising the steps of:

(a) providing boards transported on a conveyor along a carrying plane with their longitudinal axes extending across a direction of travel of the conveyor;
    (b) providing means of rotation with means of gripping mounted thereon, the means of gripping is arranged at a lateral distance from the conveyor;
    (c) rotating the means of rotation to synchronously align the means of gripping with each board while the means of gripping rotates upwards from a position below the carrying plane of the conveyor;
    (d) detecting each board by a sensor;
    (e) generating a signal in response to the sensor when determining whether the board is to be turned;
    (f) conveying the signal to means of operating the means of gripping for switching the means of gripping between an open position and a closed position to thereby grip hold of an end of the board that extends sideways out of the conveyor;
    (g) activating the means of rotation so the means of gripping is rotated above the carrying plane of the conveyor until the board has been turned; and
    (h) activating the means of gripping between its closed and open positions allowing the means of gripping to release the end of the board and thereby replace the board on the conveyor.

* * * * *